BACKFLOW PREVENTION DEVICE

Filed June 26, 1961 6 Sheets-Sheet 1

INVENTORS
Donald G. Griswold
Miles M. Chard
Fred K. Wyckoff
William S. Grau
BY Bacon & Thomas
ATTORNEYS

BACKFLOW PREVENTION DEVICE

Filed June 26, 1961

INVENTORS
Donald G. Griswold
Miles M. Chard
Fred K. Wyckoff
William S. Grau
BY Bacon & Thomas ATTORNEYS

BACKFLOW PREVENTION DEVICE

Filed June 26, 1961 6 Sheets-Sheet 3

INVENTORS
Donald G. Griswold
Miles M. Chard
Fred K. Wyckoff
William S. Grau
BY Bacon & Thomas
ATTORNEYS March 16, 1965 D. G. GRISWOLD ETAL 3,173,439

BACKFLOW PREVENTION DEVICE

Filed June 26, 1961 6 Sheets-Sheet 4

INVENTORS
Donald G. Griswold
Miles M. Chard
Fred K. Wyckoff
William S. Grau

BY Bacon & Thomas ATTORNEYS

March 16, 1965 D. G. GRISWOLD ETAL 3,173,439
BACKFLOW PREVENTION DEVICE
Filed June 26, 1961 6 Sheets-Sheet 5
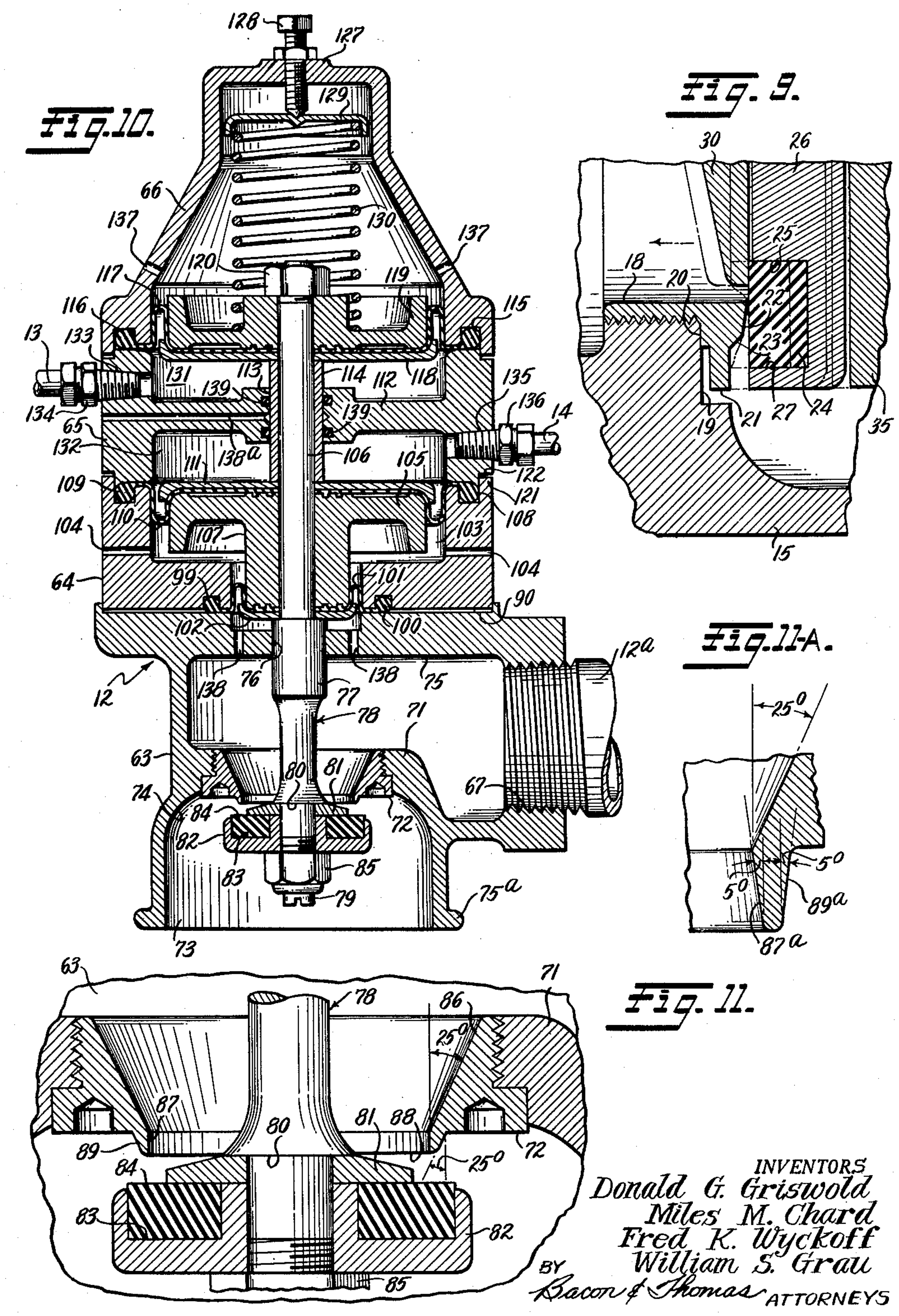
FIG. 10, FIG. 9, FIG. 11-A, FIG. 11
INVENTORS
Donald G. Griswold
Miles M. Chard
Fred K. Wyckoff
William S. Grau
BY Bacon & Thomas
ATTORNEYS INVENTORS
Donald G. Griswold
Miles M. Chard
Fred K. Wyckoff
William S. Grau
BY Bacon & Thomas
ATTORNEYS 3,173,439
BACKFLOW PREVENTION DEVICE Donald G. Griswold, 2231 Pacific Drive, Corona Del Mar, Calif.; Miles M. Chard, 1100 Clay St., Newport Beach, Calif.; Fred K. Wyckoff, 30802 S. Coast Highway, Laguna Beach, Calif.; and William S. Grau, 446 Irvine Ave., Newport Beach, Calif.

Filed June 26, 1961, Ser. No. 119,553
28 Claims. (Cl. 137—107)

This invention relates to backflow prevention devices adapted to prevent contamination of public water distribution systems supplying drinking water to dwellings, hotels, factories, shipyards, docks and other facilities, public buildings, etc.

Sanitary engineers and health authorities are now more concerned than ever before with the importance of protecting public water supply systems against contamination resulting from cross-connections or back siphonage of unpotable water into the city water mains from a consumer's property. The records are replete with histories of epidemics of amoebic dysentery and other ailments which have resulted in serious illnesses and, in many instances, death, and which are directly traceable to the pollution of water supply systems.

While previous attempts have been made to meet the problem of backflow prevention, there still remains a need for a simple device that provides positive protection against backflow, but which is not affected by variations in line pressure, and which does not produce an excessively high pressure drop at the consumer's supply point during normal flow condition and under periods of high demand such as might occur during a fire. Thus, whereas prior units operate properly at certain line pressures, but waste water by excessive discharge of water to atmosphere upon increase in line pressure, the present unit is relatively unaffected by such variations. Also, whereas prior units have produced a line pressure drop of about 20 p.s.i., the present units operate with an appreciably lower pressure drop of 8½ p.s.i. under corresponding flow rates in gallons per minute (g.m.p.).

Most backflow prevention units include shut-off valves of some sort at the opposite ends of the unit, two check valves between the shut-off valves, and a relief valve arranged to drain the space between the two check valves in the event that a backflow or other malfunction arises. The check valve at the end of the unit that is connected with the water main is commonly referred to as the first check, or number one check, and the check valve at the end of the unit connected with the consumer's pipe system is commonly referred to as the second check, or the number two check.

The foregoing advantages of the present backflow prevention unit are attained by using specially designed check valves that function without inducing high pressure drops across the unit, and by employing with these check valves, a specially designed relief valve that will respond to low differential pressures, and wich is unaffected by variations in line pressure, within the operating pressure range of the unit.

The principal object of the invention is to provide a backflow prevention device that will meet and comply with all known sanitation requirements.

Another object is to provide a dependable backflow unit that will positively prevent all return flow of water therethrough from the consumer's pipe system to the water supply mains, or from any non-potable source of water to a potable system within a consumer's property.

Another object is to provide a backflow unit, including check valves that are positively closed and maintained closed by a toggle lever arrangement whenever the pressure at the supply main end of the unit is approximately equal to that at the service pipe end of the unit, and which check valves are positively held closed by the toggle mechanism except when the difference in pressure between the supply main and the service pipe exceeds the closing forces acting on the check valves by a predetermined amount.

Another object is to provide a backflow unit, including a pair of check valves which, when in their open position, permit a clear or substantially unobstructed flow of water through the unit.

Another object is to provide a blackflow unit which includes check valves that provide for a low pressure drop across the unit, and wherein the first check valve produces a greater pressure drop than the second check valve.

A very important object is to provide a backflow unit having a relief valve that will open in response to a low pressure differential across the first check valve.

A still further object is to provide a backflow unit that can be completely assembled at the factory, shipped in toto, readily installed in a water supply main as an assembled unit, and serviced by gaining access to the working parts of the valves without removing the unit from the main.

A further and more specific object is to provide a check valve that provides for substantially unobstructed flow therethrough, and which includes a toggle lever system normally urging the valve to closed position with a powerful and increasing force as the closed position is approached, and which requires a relatively low pressure differential to effect opening thereof, and wherein the force required to hold the valve open decreases as the flow rate increases in the normal operational range of the unit.

Another specific object is to provide a pressure differentially operated relief valve wherein the pressures are substantially balanced so that it will not open until the differential pressure is about 2 pounds or less, regardless of variations in line pressure within the pressure range of the unit, whereby needless opening of the relief valve and waste of water is avoided.

Other objects and advantages of the invention will be pointed out hereinafter and will be apparent from the following description taken in conjunction with the accompanying drawings in which:

FIG. 9 is an enlarged fragmentary sectional view illustrating certain important details of the seat and valve disc retainer of the check valve shown in FIG. 5;

FIG. 10 is a vertical sectional view through the pressure differential operated relief valve taken on the line 10—10 of FIG. 2, the valve inlet being shown out of correct phase to facilitate illustration;

FIG. 11 is an enlarged fragmentary sectional view of the seat and cooperating valve element of the relief valve shown in FIG. 10;

FIG. 11A is a fragmentary sectional view of a modified seat;

Figures 1, 2:
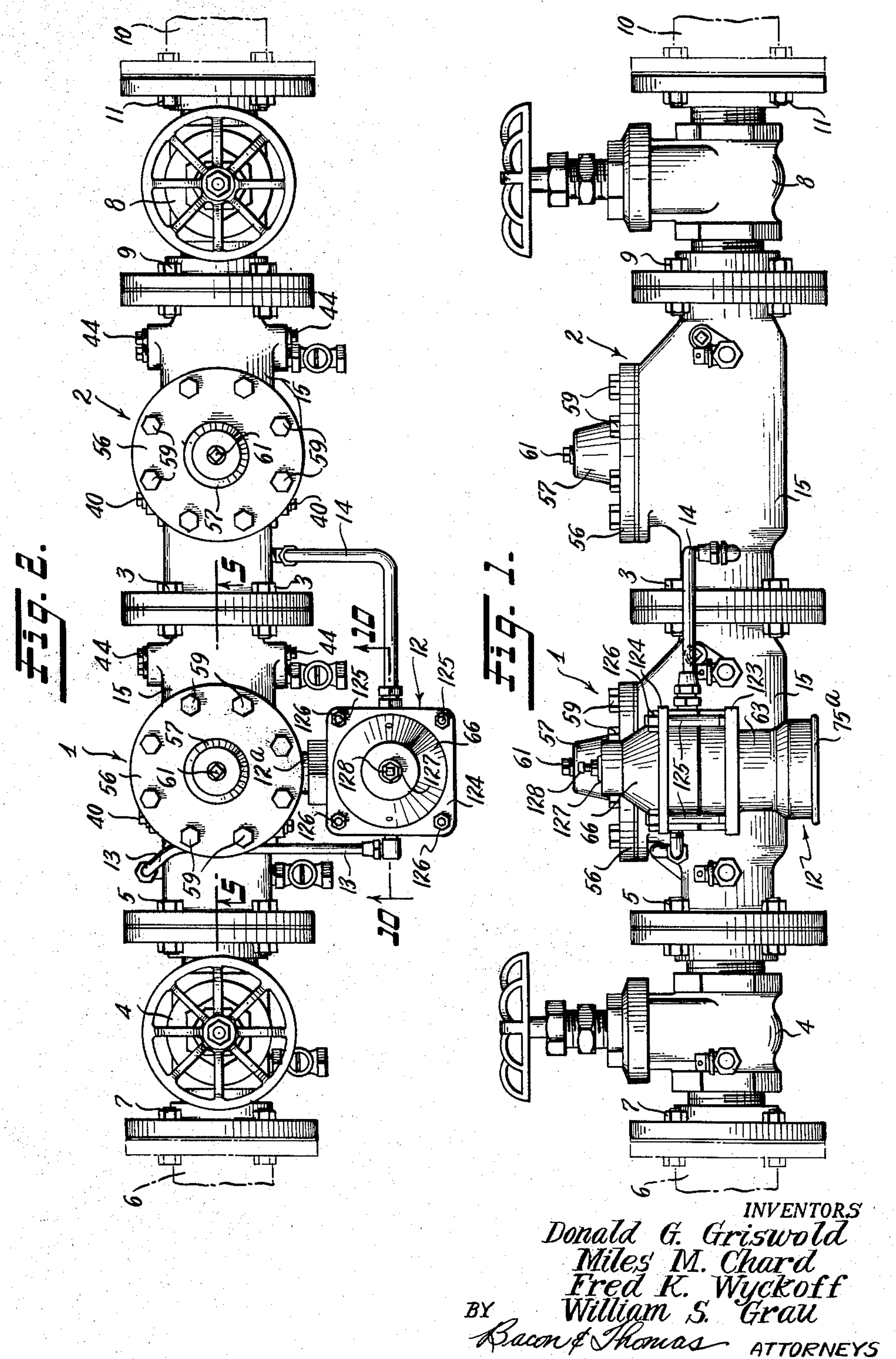
FIG. 1 is an elevational view of a backflow prevention unit embodying the principles of the present invention.
FIG. 2 is a plan view of the backflow unit shown in FIG. 1.
Figure 4:
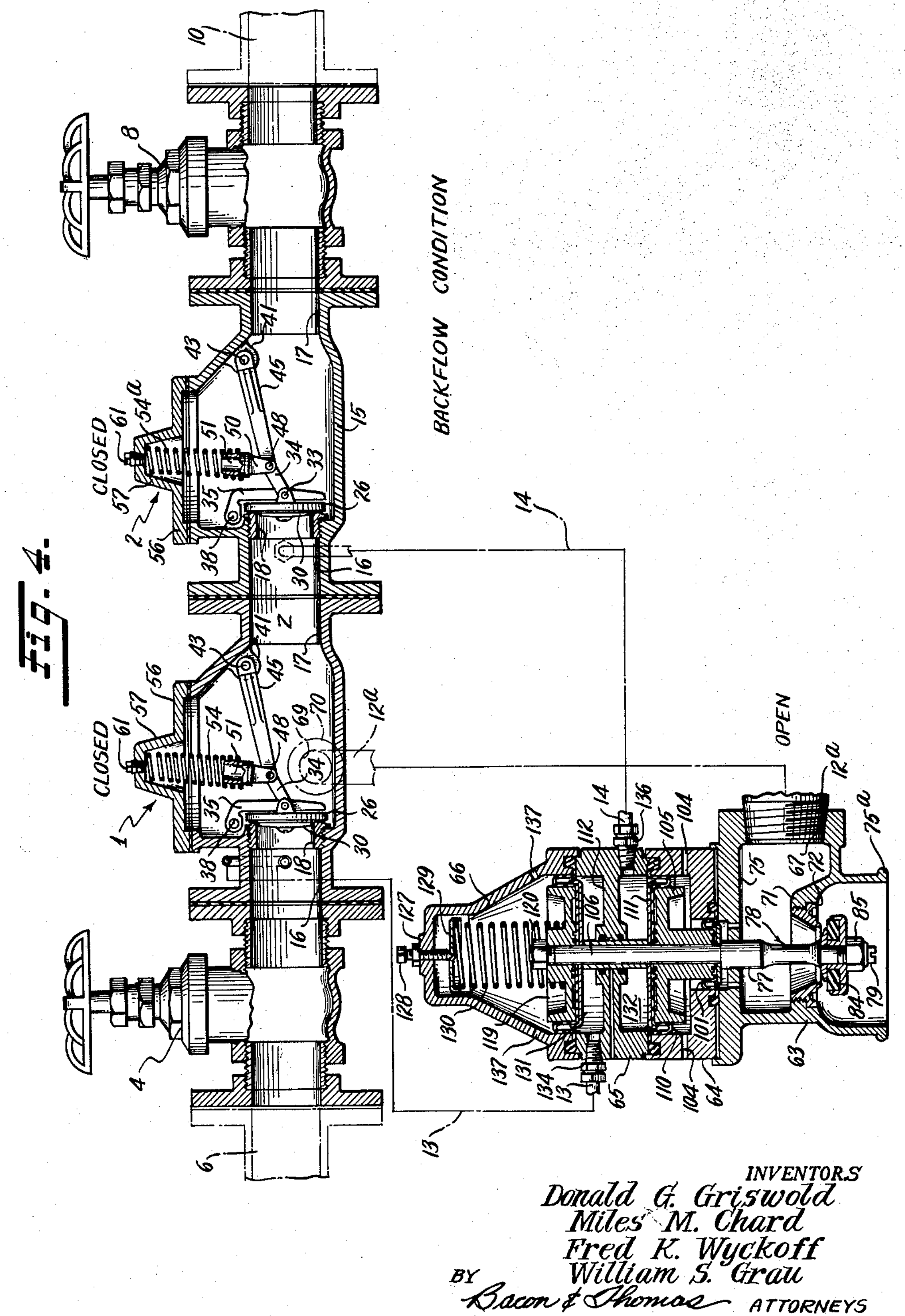
FIG. 4 is a view similar to FIG. 3, but showing the check valves and the relief valve in the positions they assume during a backflow or leakage condition of the check valve at the consumer end of the unit.
Figure 5:
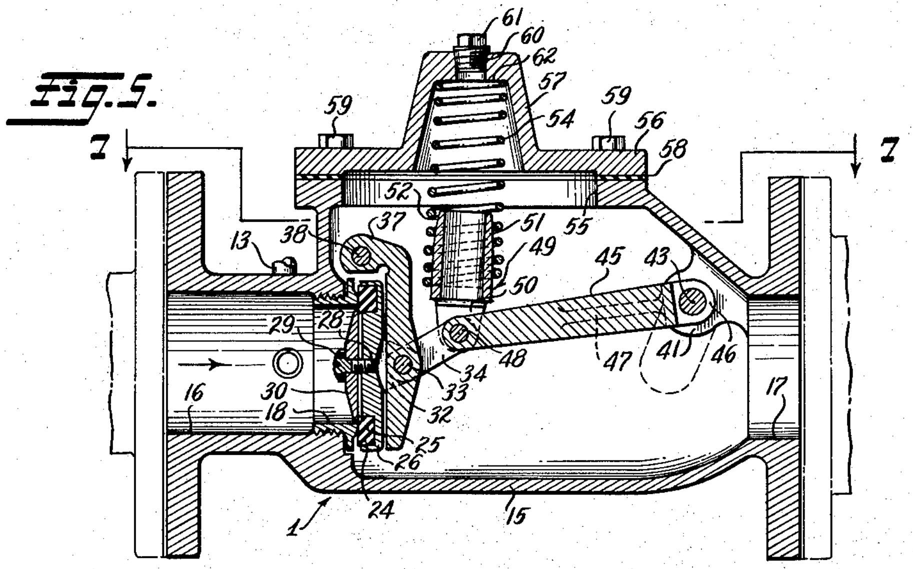
FIG. 5 is an enlarged vertical sectional view through one of the check valves, taken on the line 5—5 of FIG. 2, showing the valve in fully closed position.

Referring to FIGS. 1 and 2, the backflow unit comprises a first check valve 1 and a second check valve 2, the valves having flanged ends connected by bolts 3. A conventional, flanged gate valve 4 is secured at the inlet side of the check valve 1 by bolts 5, and the inlet of the gate valve 4 is connected to a supply main 6 (shown in dot-and-dash lines) by bolts 7. A conventional, flanged gate valve 8 is connected to the outlet end of the check valve 2 by bolts 9, and its outlet side is connected with a service pipe 10 (shown in dot-and-dash lines) by bolts 11. A relief valve 12 is connected by a pipe nipple **12*a* with the check valve 1 so that its inlet communicates with a zone Z including the outlet of the check valve 1 and the inlet of the check valve 2, as is best indicated in FIG. 4. The relief valve 12 includes pressure chambers (described later) that are connected with the inlet side of the sheck valve 1 by a conduit 13 and with the inlet side of the check valve 2 by a conduit 14**.

The gate valves 4 and 8 are conventional and serve as shut-off valves for isolating the backflow unit from either the supply main 6 or the service pipe 10 for inspection or repair.

The check valves 1 and 2 are preferably alike and a description of one will suffice for both. The details of the check valve are shown in FIGS. 5 to 9, wherefrom it will be seen that the valve includes a body 15 having an inlet 16 and an outlet 17 axially aligned therewith. The inner end of the inlet 16 is threaded to receive a seat 18. As is best shown in FIG. 9, the valve body 15 is machined to privide a flat, annular shoulder 19 disposed perpendicular to the axis of the seat 18. The seat 18 has a flat surface 20 that engages the shoulder 19. A flange 21 projects laterally from the seat 18 and is spaced from the shoulder 20. The inner face 22 of the seat 18 is beveled on an angle of about 5° and merges into a chamfered portion 23. The purpose of the flange 21 will be explained more fully hereinafter.

The seat surface 22 is adapted to be engaged by a disc 24 which may be of synthetic rubber or other yieldable material. The disc 24 is received in a groove 25 in a disc retainer 26 having a marginal flange 27 of approximately the same outside diameter as the flange 21, so that it is adapted to engage therewith under abnormal wear or compression of the disc 24, as will be explained more fully hereinafter. The disc retainer 26 has a centrally threaded opening 28 for receiving a screw 29 that extends through a disc guide 30 to clamp the disc 24 in place.

The disc retainer 26 also has a pair of spaced ears 32 which receive a pin 33 for pivotally connecting one end of a pair of links 34 thereto. The pin 33 extends through a hinge member 35 that has a laterally extending eye 37 for pivotally mounting the same upon a pin 38. The valve body 15 has aligned threaded openings 39 in the opposite side walls thereof for receiving the pin 38. Plugs 40 mounted in the openings 39 retain the pin 38 within the valve body 15.

The valve body 15 also has aligned bosses 41 on the opposite sides thereof which have openings 42 for a pin 43. The outer ends of the openings 42 are threaded and closed by plugs 44. A lever arm 45 has a pair of spaced ears 46 at one end that have openings for pivotally mounting the same upon the pin 43. Triangular webs 47 reinforce the lever 45 adjacent the ears 46. The opposite ends of the lever 45 is connected by a pin 48 with the links 34, and as is evident from the drawings, the distance between the axes of the pins 43 and 48 is slightly less than about four times the distance between the axes of the pins 33 and 48.

Figure 8:
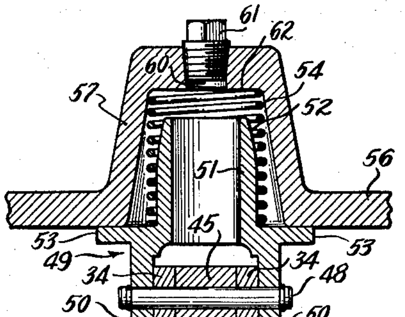
FIG. 8 is a fragmentary vertical sectional view taken on the line 8—8 of FIG. 6.

A yoke 49, see FIG. 8, has a pair of depending ears 50 through which the pin 48 extends. As is here shown, the lever 45 is mounted on the pin 48 between the links 34. The yoke 49 includes an elongated cylindrical portion 51 that is tapered at its upper end 52. The cylindrical portion 51 has diametrical, outwardly projecting stops 53 at its base. A compression spring 54 seats on the yoke 49 in the region of the stops 53.

The valve body 15 has a circular opening 55 at its upper end that is closed by a cover 56 having a central conical boss 57. A gasket 58 is disposed between the body 15 and the cover 56. Bolts 59 extend through the cover 56 and gasket 58 into threaded openings in the body 15 for mounting the cover 56 in place. A threaded vent opening 60 in the boss 57 is closed by a plug 61. The interior of the boss 57 includes a shoulder 62 that serves as a seat for the upper end of the spring 54.

Figure 6:
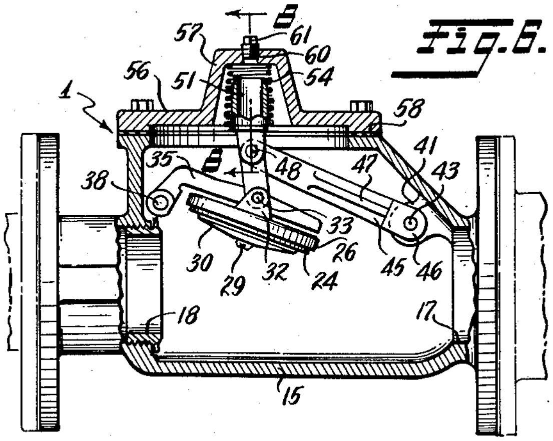
FIG. 6 is a view similar to FIG. 5, but showing the valve in its fully open position.

It will be understood that the proportions and arrangement of the lever 45, the links 34 and the pivot pins 33, 38, 43 and 48 are such that a toggle mechanism is formed wherein, when the valve is fully opened, the axis of the pin 48 lies above a line drawn through the axes of the pivot pins 33 and 43 and that when the valve is fully closed the axes of the pin 48 lies on a line intermediate lines drawn through the axes of pivot pins 43 and 33. It will also be understood that the spring 54 acts on the toggle linkage through the yoke 49, tending at all times to urge the valve disc 24 into engagement with the seat surface 22. It will be further observed that the valve body 15 is devoid of any interior obstructions between the valve seat 18 and the outlet opening 17, whereby fluid can flow through the valve with a minimum pressure loss. It will be still further understood that when the valve is in its wide-open position, as shown in FIG. 6, pivot pin 48 is substantially vertically aligned with the axis of the spring 54, and that the stops 53 on the yoke 49 engage the lower surface of the cover 56 and positively limit the extent of opening of the valve and also the extent of compression of the spring 54. This spring is preferably made of stainless steel and is designed so that for a 2" valve, a pressure differential of about 5.6 p.s.i. is required to start opening movement of the first check valve 1, with a required increase in this differential up to slightly under 8 p.s.i. to initially open the valve approximately one to two degrees. The 8 p.s.i. differential pressure, it will be noted, corresponds to a flow rate of about 6 g.p.m. However, once the check valve has been opened, the differential pressure required to maintain the same open, decreases as the rate of flow increases. Thus, at a flow rate of about 90 g.p.m., the pressure loss through the first check valve, due to the force required to maintain the valve open, is about 4.6 p.s.i., or about 1 p.s.i. less than the unseating force.

Figure 3:
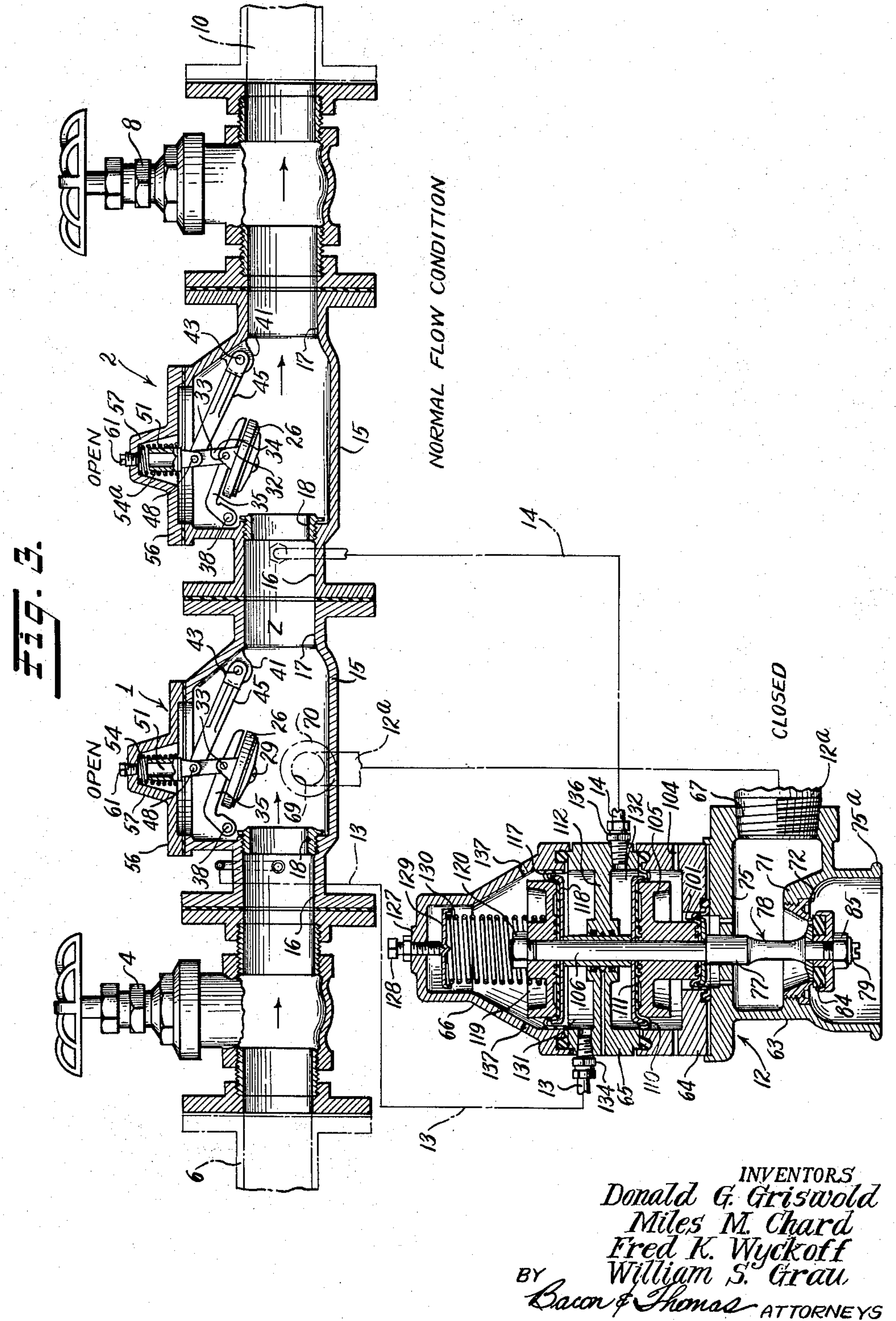
FIG. 3 is a diagrammatic, longitudinal sectional view through the backflow unit of FIG. 1, but showing the parts of the check valves and relief valve in the positions they assume during a normal flow condition.
Figure 12:
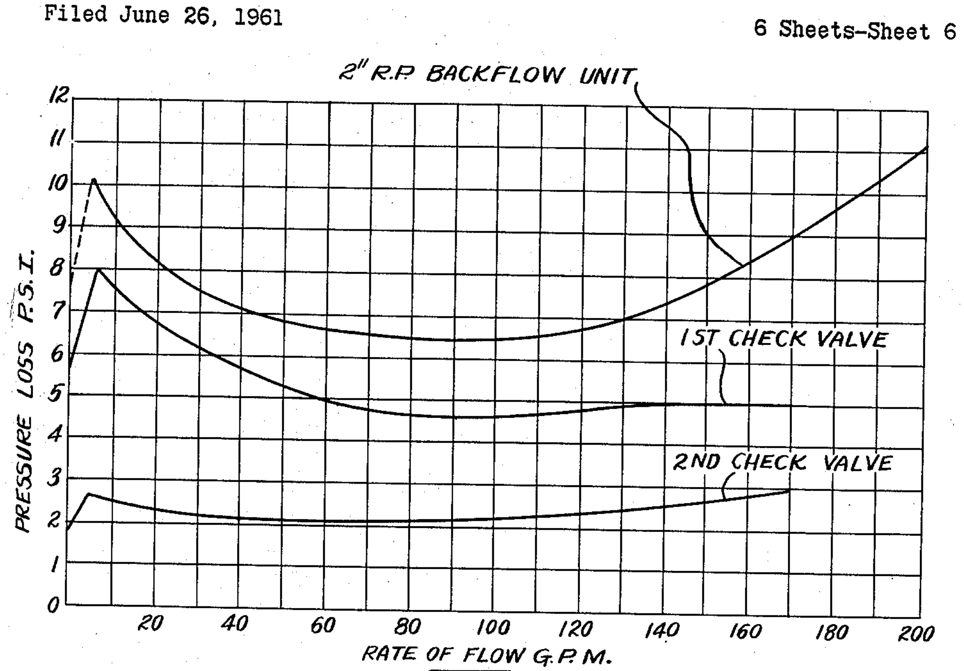
FIG. 12 is a graph showing the pressure characteristics of a backflow unit for a 2" pipe line, including an indication of the pressure loss at various flow rates across the entire unit, across the first check valve and across the second check valve.

The second 2" check valve 2 is preferably identical to the check valve 1, but is provided with a weaker spring **54*a*, FIG. 3, having the pressure loss characteristics illustrated in FIG. 12. Thus, the pressure differential required to unseat the disc of check valve 2** is about 1.8 p.s.i. rising to about 2.6 p.s.i. to effect opening of the valve, with a flow of about 4 g.p.m. As the flow rate increases, there is a decrease in the pressure drop so that for the same flow rate of 90 g.p.m., the pressure drop is about 2.2 p.s.i. and gradually increases as the flow rate increases. The overall pressure drop characteristics of the backflow unit are represented by the top curve of FIG. 12.

Figure 13:
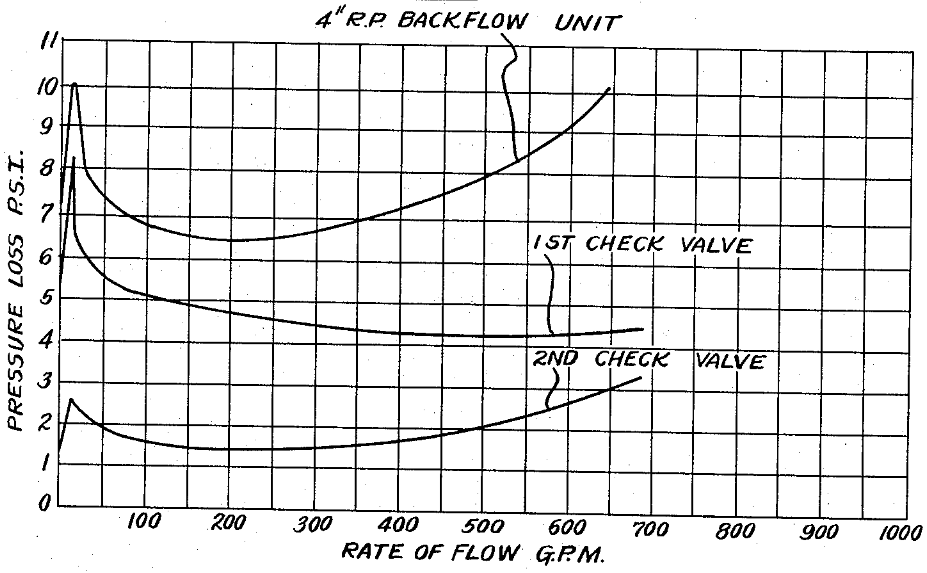
FIG. 13 is a similar graph for a backflow unit for a 4" pipe line.

In the case of a unit having 4" check valves, the valves and springs are designed so that the pressure drop incident to unseating the valve discs is about the same as in the 2" unit, as will be seen from a comparison of FIG. 13 with FIG. 12. In the 4" unit also, the pressure drop decreases as the flow rate increases, except when extremely high flow rates are reached.

A 1" pressure differential relief valve may be used for ¾" to 2½" backflow units and a 2" relief valve may be used for 3" to 10" backflow units.

Figure 7:
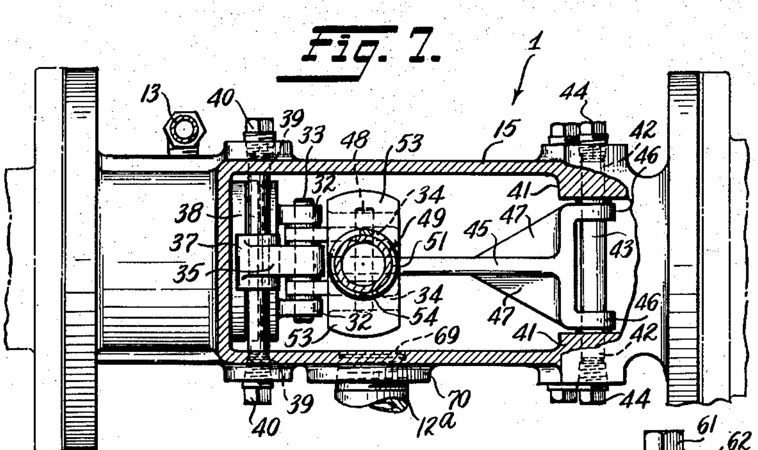
FIG. 7 is a horizontal sectional view taken on the line 7—7 of FIG. 5.

The details of the differential pressure relief valve 12 are shown in FIGS. 10 and 11. This valve has a body made of four sections 63, 64, 65 and 66. The lowermost section 63 has a threaded inlet opening 67 for receiving one end of the pipe nipple 12*a*, the other end of which is mounted in a threaded opening 69 formed in a boss 70 projecting from a side wall of the check valve body 15, as indicated in FIG. 7. The section 63 has a partition 71 with a threaded opening in which a seat 72 is mounted. A discharge opening 73 is disposed below the seat 72 and its upper portion is somewhat dome-shaped, as indicated at 74, in order to provide minimum resistance to the discharge of water through the seat 72. The outlet 73 is devoid of threads and is surrounded by a bead 75*a* in order to avoid attempts to attach a pipe or other conduit to said outlet, which is intended to discharge to the atmosphere.

The body section 63 includes an upper wall 75 having an opening 76, which slidably receives an enlarged portion 77 of a valve stem 78. The lower end 79 of the valve stem is reduced and threaded and extends from a shoulder 80 that forms an abutment for a clamping disc 81. A disc retainer 82 has a groove 83 containing a valve disc 84. The retainer 82 is mounted on the stem portion 79 and is held in place by a nut 85. The disc 84 cooperates with the seat 72 for controlling flow through the relief valve 12.

As is best shown in FIG. 11, the seat 72 has an internal conical surface 86 which slopes on an angle of about 25° relative to the axis of the stem 78. The conical surface merges into a cylindrical surface 87 defining, in part, a raised seat or ridge 88. The outer surface of the ridge 88 is formed on a slight radius starting at the cylindrical surface 87, and merges into an inclined outer surface 89 that extends on an angle of about 25°. This angle may be varied but should not exceed 40°.

The purpose of the raised seat 88 with its radius and inclined surface 89 is to prevent water discharging under pressure from creating a suction action that would tend to make the valve disc 84 flutter and/or suck it toward closed position, and thus close valve 12 when it should remain open. It will be noted incidentally that the portion of the valve stem 78 between the enlargement 77 and the reduced portion 79 is reduced in diameter to increase the flow capacity through the valve seat 72, the flaring adjacent to the clamping disc 81 aiding in streamlining the flow through the valve.

The upper wall 75 of the body section 63 is recessed as indicated at 90 for the reception of the lower end of the section 64. The lower surface of the section 64 has a groove 99, which receives the outer thickened edge 100 of a rolling diaphragm 101. A clamping disc 102 is mounted upon the valve stem 78 and engages the upper face of the stem enlargement 77 to form a support for the lower side of the diaphragm 101. The section 64 contains a chamber 103 that continuously communicates with the atmosphere through vent openings 104 located at the lower part of the chamber 103. A piston 105 is mounted upon a reduced upper extension 106 of the valve stem 78 and has a cylindrical central projection 107 that engages the upper surface of the diaphragm 101.

The section 64 has a groove 108 formed in its upper surface to receive the thickened margin 109 of a relatively larger rolling diaphragm 110. The lower surface of the diaphragm 110 engages the upper surface of the piston 105, and a clamping disc 111 engages the upper surface of diaphragm 110 to clamp it against the piston.

The section 65 has an intermediate transverse wall 112 provided with a central opening 113, which slidably receives a spacer sleeve 114, the lower end of which is engaged with the clamping disc 111.

The section 66 serves as a cover and has a groove 115 at its lower edge, which receives the thickened margin 116 of a rolling diaphragm 117 that is identical to the diaphragm 110. A clamping washer 118 is engaged with the upper end of the spacer 114 and forms a support for the lower side of the diaphragm 117. A piston 119 is mounted upon the stem portion 106 and engages the upper side of the diaphragm 117. The upper extremity of the stem 78 is threaded, and a nut 120 mounted thereon secures the clamping disc 102, diaphragm 101, piston 105, diaphragm 110, clamping disc 111, sleeve 114, clamping disc 118, diaphragm 117, and piston 119, in assembled relation with the valve stem 78. It will be noted that the clamping discs 102, 111 and 118 all have margins that are cupped to provide good support for the rolling diaphragms associated therewith. The valve stem surfaces 77 and 114 are fluorocarbon resin to provide a slippery surface to reduce friction in the operation of the relief valve.

The sections 64 and 65 are maintained in proper registration by a marginal ridge 121 on the section 64 and a complementary marginal recess 122 formed in the section 65. The section 65 and cover 66 are maintained in registration by a similar ridge and recess arrangement. As is shown in FIGS. 1 and 2, the section 63 has a generally square flange 123 at its upper end, and the cover section 66 has a similar flange 124 formed at its lower end. A stud 125 is mounted at each corner of the flange 123 and extends through an opening in a corner of the flange 124. A nut 126 is threaded onto each stud 125 for securely clamping the body sections 63, 64, 65 and 66 together.

The cover section 66 is hollow and has a threaded boss 127 in which an adjusting screw 128 is mounted. A cup-shaped washer 129 is engaged by the lower end of the screw 128 and receives the upper end of a compression spring 130, the lower end of which is engaged with the piston 119. The purpose of the screw 128 is to vary the force that may be exerted by the spring 130 to meet various installation requirements, it being understood that the screw 128 may be omitted if desired and a calibrated spring of predetermined force characteristics used.

The intermediate wall 112 in the section 65 provides an upper chamber 131 and a lower chamber 132. A threaded opening 133 communicates with the chamber 131 and has a conventional fitting 134 mounted therein which is connected to one end of the conduit 13 leading from the inlet chamber of the check valve 1. A similar threaded opening 135 communicates with the lower chamber 132 and has a fitting 136 mounted therein which is connected to one end of the conduit 14 leading from the inlet of the check valve 2.

Pressure fluid communicated to the chamber 131 through the conduit 13 will act upon the valve stem through the diaphragm 117, in opposition to the force of the spring 130, and tend to move the valve stem 78 in a direction to close the relief valve 12 or to maintain it closed. On the other hand, pressure fluid communicated to the chamber 132 through the conduit 14 will act on the valve stem 78 through the diaphragm 110 and tend to move the valve stem 78 in a direction to open the relief valve 12. It will be noted that the pressure in the chamber 132 is supplemented by the force of spring 130 in tending to open the relief valve 12.

The force exerted by the spring 130 is preferably such that a pressure differential of only 2 pounds or less in the chambers 131 and 132 will cause the relief valve 12 to open and thereby effect drainage of any liquid in the zone Z, as will be explained more fully hereinafter. In this connection, the cover section 66 is vented to the atmosphere through openings 137, so that atmospheric pressure acts upon the upper side of the piston 119 and on the diaphragm 117 against the hydraulic pressure in chamber 131. Similarly, atmospheric pressure acts upon the lower surface of the piston 105 and diaphragm 110 through the vent openings 104, against the hydraulic pressure in the chamber 132. The wall 75 of the section 63 has vent openings 138 which communicate the inlet pressure of the relief valve 12 to the lower side of the clamping disc 102 and the diaphragm 101. Atmospheric pressure is effective upon the upper side of the diaphragm 101 through the vent openings 104.

The vent openings 104 and 137 serve the additional purpose of enabling malfunctioning of the unit to be detected. Thus, if either the diaphragm 101 or 110 should leak, water could escape from the chamber 103 through the vents 104, thereby indicating that one or the other of the diaphrams requires repair. Similarly, the vent openings 137 would indicate leakage past the diaphragm 117. A further indication of leakage is provided by the presence of a radial passage 138*a* in the wall 112, this passage extending from the spacer opening 113 to the exterior of the section 65. A seal against leakage through the passage 138*a* is normally effected by conventional O-rings 139 surrounding the spacer 114.

The fixed (or adjusted) force exerted by the spring 130 is preferably 3 p.s.i. plus or minus ½ p.s.i. difference in pressure between chambers 132 and 131. The effective areas of the diaphragms 110 and 117 are equal. The effective area of the diaphragm 101 is equal to the effective area at the seat 72. Thus, the hydraulic forces can be virtually balanced, and the spring load becomes the major factor tending to open the relief valve 12.

The design of the relief valve 12 is such that when operating as a component of a backflow unit, it will normally remain in a closed position so long as the difference in the pressures at the inlet of the check valve 1 and in the zone Z between the two check valves 1 and 2, exceeds 2 p.s.i.. If the pressure differential drops to 2 p.s.i. the relief valve 12 will open, and continue to open wider should the pressure in the zone Z decrease relative to the pressure at the inlet side of the check valve 1.

In the normal operation of the present backflow unit, check valves 1 and 2 will be open and relief valve 12 will be closed, as shown in FIG. 3. The check valve 1 by itself would reduce the supply pressure by a predetermined amount, for example, about 4½ p.s.i. at 100 g.p.m. (see FIG. 12). The check valve 2 also reduces the pressure, but in a lesser amount. At a flow rate of 100 g.p.m. check valve 2 by itself would reduce the pressure about 2.2 p.s.i. However, the check valves in combination in the unit produce an over-all pressure drop of only about 6.5 at the 100 g.p.m. flow rate. During normal flow, and at cessation of flow, the pressure in the zone Z between the check valves 1 and 2 will be less than the supply main pressure. Moreover, it will be understood that the check valves 1 and 2 open only sufficiently to supply the existing demand.

Under static conditions, both check valves 1 and 2 are positively held closed by the extreme power, made available through the spring-actuated toggle lever system incorporated therein, which increases as the linkage approaches a straight line. Should the spring 54 fail, the gravity effect of the hinge 35, links 34, lever 45 and yoke 49 will move the valve disc 24 into firm engagement with the seat 18. Also, the pin 38 is so located that even without the pressure of the toggle mechanism, the disc 24 would seat by gravity due to the offset mounting and weight of the hinge 35. It will be apparent that the force of the spring 54 acts in the same general direction as the force of gravity, i.e. in a direction away from the cover 56.

Assuming that the pressure in the supply main 6 drops to a value below that of the pressure in the service pipe 10 (due to excessive demand by others), the check valves 1 and 2 will automatically close tightly. Under these conditions, the relief valve 12 will be wide open. Normally, both check valves 1 and 2 will remain closed until the pressure conditions are reversed, thereby preventing backflow through the unit. On these conditions, the relief valve 12 will also be wide open thereby causing the space between the two check valves to be at atmospheric pressure.

On the other hand, if the check valve 2, which is nearest to the service pipe 10, should leak at this time, any such leakage would discharge directly to atmosphere through the relief valve 12. The relief valve opens when the pressure in the zone Z rises to within about 2 p.s.i. of that in the supply main 6, and such pressure is communicated through the conduit 14, FIG. 4, to the pressure chamber 132 and augments the force of the spring 130 to flex the diaphragm 110 downwardly, with a corresponding shifting of the stem 78 in the same direction, thereby urging the valve disc 84 from its seat 88 to effect opening of the relief valve 12 and venting of the zone Z to the atmosphere. Upon restoration of an increased pressure in supply main 6, this will be communicated to pressure chamber 131 to act upon diaphragm 117 to overcome the force of spring 130 and close the valve 12.

The relief valve 12 thus opens automatically in the event that the check valve 2 leaks, thereby positively preventing backflow through the unit. The discharge of water from the relief valve 12 will also indicate that the check valve 2 is not functioning properly and requires attention.

If the pressure drop in the supply main 6 is such that a vacuum condition occurs therein, this would tend to cause back-siphoning of water into the main 6. This is dangerous and highly undesirable and is avoided by the present unit in that any lowering of the pressure on the inlet side of the check valve 1 below atmospheric pressure will be communicated through the conduit 13 to the chamber 131 of the relief valve 12, lowering the pressure therein, and enabling the pressure in the chamber 132, augmented by the force of the spring 130, to automatically open the relief valve 12 to drain the zone Z, and thereby prevent water from being drawn past check valve 1, even if it should have a tendency to leak. Upon a reversal of the pressure conditions, an increase in pressure in the supply main 6 will close the relief valve 12, as above described.

FIG. 11A shows a modification of the seat shown in FIG. 11, wherein the cylindrical surface 87 is replaced by an inclined surface 87*a* extending on an angle of about 5°, as shown. In addition, the angular surface 89 is replaced by an angular surface 89*a*, also disposed on an angle of about 5°, as shown. The angular surfaces 87*a* and 89*a* are connected by a surface on a small radius (1/32"), the same dimension as the radius at the edge of the seat ridge in FIG. 11. The ridge is preferably of the same height (1/16") in both seats.

It will be understood that while the present backflow unit has been described as operating under certain prescribed pressure conditions, the functional advantages thereof can be obtained by operating under other pressure conditions, within limits, of course.

It will also be understod that the size, shape and arrangement of the elements of the check and relief valves may be varied from that disclosed herein, without departing from the principles of the invention or the scope of the annexed claims.

We claim:

1. A backflow prevention unit adapted to be connected between a supply main and a service pipe, comprising: a first check valve and a second check valve, said check valves being connected in series and being constructed to provide for straight-through, substantially unobstructed fluid flow therethrough when fully open, said first check valve having an inlet adapted to be subjected to the pressure in said supply main, and said second check valve having an outlet adapted to be subjected to the pressure in said service pipe; a differential pressure relief valve communicating with said check valves at a zone including the outlet of the first check valve and the inlet of the second check valve for effecting draining of said zone; and means controlling said relief valve, including a pair of diaphragm elements responsive to the differential pressure across said first check valve, one of said diaphragm elements having one face thereof subject to the pressure at the inlet side of said first check valve to flex the same in one direction and the other of said diaphragm elements having one face thereof subject to the pressure at the inlet of said second check valve to flex the same in the opposite direction, the other face of both diaphragm elements being subject to atmospheric pressure, said differential pressure responsive means being effective to open said relief valve when the pressure at the inlet side of the first check valve is less than the pressure at the inlet side of said second check valve, or if the pressure at the outlet side of said second check valve is greater than the pressure at the inlet side of the first check valve and the second check valve is leaking.

2. A backflow prevention unit as defined in claim 1, in which the relief valve comprises a body having a pair of pressure chambers defined in part by the diaphragm elements; means connecting one of said pressure chambers with the inlet side of the first check valve to transmit pressure therefrom to said one face of said one diaphragm element; means connecting the other pressure chamber with the inlet side of the second check valve to transmit pressure therefrom to said one face of said other diaphragm element; a flow-control element; a stem connected with said diaphragm elements and said control element for controlling the flow through said relief valve; and means exerting a predetermined force continuously biasing said stem toward valve opening position.

3. A backflow prevention unit as defined in claim 2, wherein the relief valve includes means for preventing the flow control element from being sucked toward closing position by the action of liquid flowing from said zone discharging through the relief valve.

4. A backflow prevention unit as defined in claim 1, in which the diaphragm elements of the relief valve are of substantially equal area and said relief valve is spring-loaded to effect opening thereof when the differential pressure drops to about two pounds per square inch or less.

5. A backflow prevention unit, as defined in claim 1, in which each of said check valves includes a pivotally mounted valve disc that can be moved by line pressure to a full open position in which it offers little resistance to flow of fluid through the unit.

6. A backflow prevention unit, as defined in claim 1, in which the first check valve is preloaded to produce a predetermined pressure drop in the unit at a given flow rate through the first check valve, and wherein the second check valve is preloaded to produce a lesser predetermined pressure drop therethrough at the same flow rate.

7. A backflow prevention unit as defined in claim 1, in which the first check valve includes a pivotally mounted valve disc and means for exerting a force tending to maintain said first check valve closed, and wherein the second check valve includes a pivotally mounted valve disc and means for exerting a relatively lower force tending to maintain said second check valve closed.

8. A backflow prevention device as defined in claim 7, in which the means for exerting the force tending to maintain at least one of the check valves closed includes a toggle lever mechanism, and a spring acting on said toggle lever mechanism urging the same toward a straight-line attitude.

9. A backflow prevention device, as defined in claim 8, wherein at least said one check valve includes means for preventing the toggle lever mechanism from assuming a straight-line attitude.

10. A check valve, comprising: a body having an inlet and an outlet, said inlet and outlet being aligned on a generally horizontal axis; a seat in said body between said inlet and outlet, and arranged at substantially a right angle to said horizontal axis; a valve disc engageable with said seat; means pivotally supporting said valve disc in said valve body; a toggle lever mechanism in said valve body pivotally connected at one end thereof with said valve disc supporting means and at the other end thereof with said body, and including a link and a lever interconnected by a pin and arranged to move in a generally vertical plane to pivot said valve disc into and out of engagement with said valve seat; said toggle lever mechanism being further arranged to be operable by gravity to urge said disc into engagement with said seat; a freely oscillatable yoke pivotally connected with said pin; and a compression spring having one end engaged with said yoke and its opposite end received within a seat in said body, said spring being arranged to provide a force acting on said yoke continuously tending to straighten said toggle lever mechanism, the force of gravity and said compression spring force being the only forces tending to straighten said toggle lever mechanism, and said valve disc being arranged to be opened against said spring and gravity forces by fluid pressure in said inlet.

11. A check valve, as defined in claim 10, in which the yoke has a tapered upper end disposed within the spring to provide clearance between the yoke and the spring, whereby to avoid excessive lateral deflection of the spring as the toggle lever mechanism pivots during opening and closing movement of the valve disc.

12. A check valve, as defined in claim10, wherein the yoke carries stop elements and the valve body includes abutment means engageable by said stop elements for limiting the opening movement of said valve disc under line pressure.

13. A check valve, comprising: a body having an inlet and an outlet, said inlet and said outlet being aligned on a generally horizontal axis; a valve seat located between said inlet and outlet, and arranged generally vertically and at substantially a right angle to said horizontal axis; a valve disc engageable with said seat; means pivotally supporting said valve disc for movement from its vertical position to an approximately horizontal position to provide substantially unobstructed, straight-through flow from said inlet to said outlet; a toggle lever mechanism; means pivotally connecting one end of said toggle lever mechanism with said valve disc supporting means; and means pivotally connecting the other end of said toggle lever mechanism to said body, said toggle lever mechanism comprising a pair of links interconnected by a pivot pin that always lies above a plane passing through the means pivotally connecting said toggle lever mechanism with said valve disc supporting means and said body, respectively, said toggle lever mechanism being operable at all times by gravity to normally urge said valve disc toward its seat and being actuatable to hold said valve disc in engagement with said seat; and actuating means connected with said toggle lever mechanism acting in the same direction as gravity for applying a straightening force thereto in addition to the force provided by gravity to urge said valve disc toward its seat.

14. A check valve as defined in claim 13, wherein the seat is metallic and has a laterally extending marginal flange and the valve disc is yieldable and has a metallic retainer associated therewith provided with a rim engageable with said flange, said flange and rim normally being spaced apart when the valve is fully closed, said rim being engageable with said flange under excessive wear or compression of said valve disc to provide metal-to-metal contact, said toggle lever mechanism being proportioned so that said metal-to-metal contact is made to prevent the toggle lever mechanism from assuming a straight-line attitude.

15. A check valve comprising: a body having an inlet and outlet arranged in alignment on a generally horizontal axis; a seat mounted in said inlet and extending at right angles to said horizontal axis thereof; a valve disc engageable with said seat; a hinge member pivotally connected by a first pin with said valve disc; a link having one end connected with said first pin; a lever in said body having one end pivotally connected with said valve body by a second pin; a third pin pivotally connecting the other end of said lever with the other end of said link, said lever and said link being arranged to move in a generally vertical plane and being operable by gravity to urge said valve disc toward its seat and being actuatable to hold the said disc in engagement with said seat; a freely oscillatable yoke, pivotally connected with said third pin; and a spring engaged with said yoke acting in the same direction as said force of gravity, and tending to move said third pin toward alignment with said first and second pins, the force of gravity and the force of said spring being the only forces tending to move said lever and said link to engage said disc with said seat.

16. A check valve as defined in claim 15, wherein the distance between the axes of said second and third pins is slightly less than about four times the distance between the axes of said first and third pins.

17. A pressure differential operable valve, comprising: a body having an inlet and an outlet and a seat between said inlet and outlet; a valve disc engageable with said seat on the discharge side of said seat for controlling flow therethrough; a valve stem connected with said valve disc and extending through said seat; means including diaphragms of equal areas and a wall between said diaphragms providing a pair of adjacent pressure chambers; means connecting said diaphragms with said valve stem, said valve body including openings for admitting operating fluid into the respective pressure chambers, said diaphragms being arranged so that operating fluid effective on one diaphragm will move the valve stem upwardly toward valve closing position, and operating fluid effective on the other diaphragm will move the valve stem downwardly toward valve opening position; means for venting leakage past said diaphragms to the atmosphere; and a spring in said valve body acting on said valve stem and tending to move the same downwardly toward valve opening position.

18. A valve as defined in claim 17, wherein the valve seat includes means for preventing fluid discharging through the seat from sucking the valve disc toward the seat.

19. A valve as defined in claim 17, in which the seat includes a raised ridge engageable by the valve disc, and wherein the ridge is defined by an arcuate surface originating at the seat opening and merging into an outwardly flaring surface disposed on an angle of about 25° to the axis of the seat, whereby to prevent discharging fluid from producing suction tending to draw the valve disc toward said seat.

20. A pressure differential operable valve, comprising: a body having four sections, the first section having an inlet and an outlet and a valve seat between said inlet and outlet; a valve disc engageable with said seat; a valve stem connected with said valve disc; a second section disposed adjacent said first section and having a central opening formed therein to receive said valve stem; a first diaphragm extending across said central opening and being connected with said valve stem; a third section disposed adjacent said second section and including a transverse wall providing a chamber for fluid pressure on the opposite sides thereof, said stem extending through said transverse wall; a fourth section adjacent said third section; a second diaphragm arranged between said second and third sections; a third diaphragm arranged between said third and fourth sections; means connecting said valve stem with said second and third diaphragms, said second and third diaphragms cooperating with the wall of said third section to provide a pair of pressure chambers, said third section having means for simultaneously introducing operating fluid under pressure into said pair of pressure chambers, whereby any differential pressure present will be effective to move said valve stem in one direction or the other to open or close the valve; and a compression spring in said fourth section acting upon said valve stem to move the same toward valve opening position.

21. A valve as defined in claim 20, in which the effective area of the seat or valve disc and the effective area of the first diaphragm are substantially equal, and wherein the effective area of the second and third diaphragms is substantially equal.

22. A check valve, comprising: a body having an inlet and outlet aligned on a generally horizontal axis; a seat mounted in said inlet and extending at right angles to said horizontal axis thereof; a valve disc engageable with said seat; a hinge member pivotally mounted in said body and being pivotally connected by a first pin with said valve disc; a link having one end connected with said first pin; a lever in said body having one end pivotally connected with said body by a second pin; a third pin pivotally connecting the other end of the lever with the other end of the link, said lever and said link being arranged to move in a generally vertical plane and being operable by gravity to urge said valve disc toward its seat and being actuatable to hold said disc in engagement with said seat; a freely oscillatable yoke pivotally connected with said third pin; a compression spring telescopically engaged at one end thereof with said yoke and acting in the same direction as said force of gravity to actuate said third pin toward alignment with said first and second pins, said body having an opening affording access to said valve disc, link, lever, yoke and spring; and a cover overlying said opening and having a recess therein receiving the other end of said spring.

23. A check valve as defined in claim 22, wherein the body has opposed side walls and an aligned pair of bosses on said side walls respectively receiving the ends of the second pin.

24. A check valve, comprising: a body having an inlet and outlet aligned on a generally horizontal axis; a seat mounted in said inlet and extending at right angles to said horizontal axis; a valve disc engageable with said seat; a hinge member pivotally mounted in said body and pivotally connected by a first pin with said valve disc; a link having one end connected with said first pin; a lever in said body having one end pivotally connected with said body adjacent said outlet by a second pin; a third pin pivotally connecting the other end of the lever with the other end of the link, said lever and said link being arranged to move in a generally vertical plane and being operable by gravity to urge said valve disc toward its seat and being actuatable to hold said disc in engagement with said seat; a freely oscillatable yoke pivotally connected with said third pin; and a spring engaged with said yoke acting in the same direction as said force of gravity to actuate said third pin toward alignment with said first and second pins, the axes of said first and third pins lying upon longitudinal lines parallel with the axis of said inlet and in planes below a longitudinal line passing through the axis of said second pin when said valve disc is in closed position, and said third pin being disposed on a line parallel with said inlet axis and above longitudinal lines passing through the axes of said first and second pins when said valve disc is in its fully open position.

25. A check valve as defined in claim 24, in which a cover is mounted upon the body and wherein the cover has a recess and one end of the compression spring is received in said recess.

26. A check valve as defined in claim 24, wherein the third pin is substantially vertically aligned with the axis of the compression spring when the valve disc is in its fully open position.

27. A check valve as defined in claim 24, in which a cover is mounted upon the body and wherein the cover has a recess and one end of the compression spring is received in said recess; and wherein the third pin is substantially vertically aligned with the axis of the compression spring when the valve disc is in its fully open position.

28. A check valve comprising: a body having an axially extending inlet opening and an outlet opening in alignment therewith on a generally horizontal axis; a valve seat mounted in said inlet opening and disposed at right angles to said horizontal axis; a valve disc engageable with said seat; a hinge member mounted within said valve body and pivotally supporting said valve disc; a toggle device including a link having one end thereof pivotally connected with said hinge member and a lever having one end thereof mounted within and pivotally connected with said valve body and having its other end pivotally connected with the other end of said link, said link and said lever being movable in a vertical plane and being arranged to be operable by gravity to urge said disc into engagement with said seat; a freely oscillatable yoke pivotally connected with said link and lever; and a compression spring in said valve body engaged with said yoke acting in the same direction as gravity, and tending to straighten said toggle device, the force of gravity and the force of said spring being the only forces tending to seat said valve disc, said disc being arranged to be opened against said gravity and spring forces by fluid pressure in said inlet.

References Cited in the file of this patent

UNITED STATES PATENTS

| | | |
|---|---|---|
| 226,059 | Gillette | Mar. 30, 1880 |
| 629,449 | Locke | July 25, 1899 |
| 945,151 | Blauvelt | Jan. 4, 1910 |
| 1,022,327 | Nelson | Apr. 2, 1912 |
| 1,031,214 | Wadsworth | July 2, 1912 |
| 1,369,137 | Simmons | Feb. 22, 1921 |
| 1,603,005 | Flam | Oct. 12, 1926 |
| 2,482,198 | Melichar | Sept. 20, 1949 |
| 2,503,424 | Snyder | Apr. 11, 1950 |
| 2,538,281 | Snyder | Jan. 16, 1951 |
| 2,646,816 | Griswold | July 28, 1953 |
| 2,827,921 | Sherman | Mar. 25, 1958 |